United States Patent Office 2,950,246
Patented Aug. 23, 1960

2,950,246

PROCESS FOR INCREASING THE PERMEABILITY OF OIL BEARING CHALK FORMATIONS

William B. Hughes, Webster Groves, Mo., and Wayne S. Fallgatter and Jack Newcombe, Tulsa, Okla., assignors to Cities Service Research and Development Company, New York, N.Y., a corporation of New Jersey No Drawing. Filed Feb. 1, 1956, Ser. No. 562,638

4 Claims. (Cl. 252—8.55)

This invention relates to new and improved compositions having properties which make them effective clay anti-swelling agents as well as improved corrosion inhibitors. More particularly, this invention is directed to new and improved compositions which are effective in simultaneously minimizing corrosion and reducing clay swelling when utilized in well treating processes.

Continuous depletion of oil sand properties has caused interest to be recently turned to those potential oil producing formations previously overlooked or by-passed because of the high cost involved in attempting to produce oil therefrom or because of the insurmountable economical problems involved in freeing oil from them. One of the great potential oil sources as yet untapped is that in which oil is present in chalk formations which contain hydratable clays.

As is well known, considerable success has been attained in recovering oil from normal chalk formations by the use of various acidization techniques. These methods introduce such acids as hydrochloric acid directly into the formation and thereafter, if required, the formation will be flushed with a fluid drive.

While such a treating technique is generally satisfactory for ordinary chalk formations, the use of such methods in treating those chalk formations which contain hydratable clays has been completely ineffective. This result is due to the swelling of the hydratable clays when they are contacted with acid or water or some of the other solutions used in acidizing and flooding techniques. While the amount of hydratable clay present in such chalk formations is comparatively small, generally amounting to less than 10%, it is dispersed throughout the chalk formation in such a manner that the least contact with water results in a swelling which, if not controlled, reduces permeability to an extent that oil flow from the formation is completely cut off.

It is accordingly an object of this invention to provide new and improved agents which on introduction into formations substantially minimize and prevent the swelling of hydratable clays.

It is another object of this invention to provide agents which may be utilized in conventional acidizing and flooding techniques which simultaneously provide increased effectiveness in treating as well as reduction in corrosivity.

It is a further object of this invention to provide a new and improved method of treating oil-bearing, hydratable clay-containing chalk formations to provide increased recovery of oil and gas therefrom.

It has now been discovered that certain new compounds obtained by first reacting substantially equimolar quantities of polyethyleneamine with a monocarboxylic acid to provide an intermediate reaction product having an imidazoline structure which is thereafter reacted with from 1 to 4 mols of ethylene oxide possess unexpectedly effective clay antiswelling and corrosion inhibiting properties.

In preparing these compounds, the intermediate imidazoline is first prepared by reacting 1 mol of a polyethyleneamine with 1 mol of a monocarboxylic acid, with the removal from the reaction mixture of 2 mols of water. This intermediate product is thereafter reacted with from 1 to 4 mols of ethylene oxide to provide a final reaction product having the desired anti-swelling and anti-corrosive properties. The exact nature of the final compound is not known, but it is believed that the ethylene oxide bonds itself to the terminal amine group on the side chain of the imidazoline intermediate product. The length of the side chain generally will depend on the particular polyethyleneamine selected to prepare the intermediate product. The following polyethyleneamines have been successfully used: diethylene triamine, triethylene tetramine, and tetraethylene pentamine.

The monocarboxylic acid used is preferably one having from 1 to about 20 carbon atoms. It has been found that while the higher molecular weight monocarboxylic acids are most satisfactory, lower molecular weight acids can also be used. For example, it has been found that palmitic and oleic acids provide reaction products which have exceptionally effective anti-swelling properties as well as effective anti-corrosion properties.

One of the important features of this invention is the obtaining of a final product which, on incorporation in a treating solution, will provide a substantially clear solution rather than a dispersion or emulsion type of solution. The obtaining of a clear solution is of considerable advantage since it has been found that utilization of dispersions in treating the dense chalk formations have a tendency to collect at the well bore, thus failing to penetrate the highly impervious chalk. Since it is desirable to effect acidization of the strata sometimes at great distances from the well bore, clear solutions which will not be filtered out or blocked by the strata are most desirable. As will hereafter be shown in the table which follows, the new compositions of this invention generally provide such clear solutions.

In order to more clearly understand the nature of the compounds which have now been discovered to be extremely effective anti-swelling and anti-corrosive agents, the following specific examples are provided:

EXAMPLE 1

To 103 grams (1.0 mol) of diethylene triamine, 88 grams (1.0 mol) of n-butyric acid were added. To this mixture, 50 ml. of toluene were added and the mixture charged to a reaction vessel provided with a decanter stillhead water trap and reflux condenser. The reaction mass was heated to remove the water-toluene azeotrope, with water being separated in the water trap and toluene being returned to the reaction vessel. After four hours of heating, 35.4 grams of water had been removed from the reaction mixture, representing substantially the theoretical quantity of water obtainable from the 1:1 molar ratio of a carboxyl group to a 1,2 diamine to form an imidazoline ring. After the 2 mols of water had been recovered, toluene was removed from the reaction vessel by distillation. The resulting product, a light yellow oil, was found to have a molecular weight of 153, as compared to a theoretical molecular weight value for the aminoethyl imidazoline of 155. The final reaction product was found to be completely dispersible in water, giving a clear solution, and was also soluble in mineral acids.

15.3 grams of the intermediate imidazoline obtained above was then dissolved in 50 grams of isopropyl alcohol and gaseous ethylene oxide bubbled into the reaction mixture until about 4.4 grams had dissolved in the solution. Heat generated during treatment with ethylene oxide was allowed to dissipate on standing. Upon reweighing of the mixture, it was found to be approximately one gram less than the original ethylene oxide-containing mixture, so that treatment was repeated until a stable solution at room temperature containing 4.4 grams (0.1 mol) of ethylene oxide was obtained. The alcohol was then removed by distillation, leaving a clear yellow, completely water-soluble product having a molecular weight of 199, indicating a 1:1 reaction ratio of ethylene oxide and the aminoethyl imidazoline.

This compound, as well as the intermediate imidazoline compound were tested as anti-swelling agents, and the results of these tests according to the method herein described are provided in Table A, which follows. The intermediate imidazoline is identified therein as compound number 1, with the ethylene oxide treated reaction product being identified as compound number 2.

EXAMPLE 2

Following the method described in Example 1 above, 282 grams (1.0 mol) of stearic acid were reacted with 103 grams (1.0 mol) of diethylene triamine. The resulting semi-solid intermediate product had a brown color, was oil-soluble, and had a molecular weight of 350. This intermediate product was dispersible in water and mineral acids.

25 grams of this intermediate product were then dissolved in 75 grams of isopropyl alcohol, with ethylene oxide gas being slowly passed into the solution. At approximately five minute intervals, five drops of the reaction mixture were placed into a test tube containing 10 ml. of 10% hydrochloric acid. After approximately 25 minutes of reaction, five drops of the solution were found to be completely soluble in 10 ml. of 10% hydrochloric acid solution. The ethylene oxide was discontinued and the alcohol removed by distillation, leaving a brown semi-solid product having a limited acid solubility and a molecular weight of 388, indicating that approximately 1 mol of ethylene oxide had reacted with the intermediate imidazoline product. The intermediate product prepared by the reaction of diethylene triamine and stearic acid is identified in Table A which follows as compound number 5. The final reaction product resulting from the addition of 1 mol of ethylene oxide is identified as compound number 6.

EXAMPLE 3

In a reaction similar to that described in Example 1, 1.0 mol of oleic acid (280 grams) and 1.0 mol of diethylene triamine (103 grams) were reacted to produce a clear product which was thereafter reacted according to the method described in Example 1 with ethylene oxide under conditions which permitted 1.0 mol of ethylene oxide to react with the intermediate product. The final reaction product was a brown liquid which was essentially soluble in mineral acids, and had a molecular weight of 391 as compared to a calculated molecular weight of 389 or a theoretical 1:1 molar reaction between ethylene oxide and the intermediate product.

EXAMPLE 4

Following the procedure set forth in Example 1, 1.0 gram mol of butyric acid was reacted with 1.0 gram mol of triethylene tetramine, and produced a viscous liquid product having a molecular weight of 298. This product, on treatment with ethylene oxide according to the method of Example 1, produced a yellow liquid, water-soluble reaction product which, in swelling and corrosion tests, provided the results recorded for compound number 11 in Table A which follows.

EXAMPLE 5

The procedure of Example 1 was followed in reacting 1.0 mol of palmitic acid (256 grams) with 1.0 mol of triethylene tetramine (146 grams). The product, a brown, oil-soluble paste, had a molecular weight of 464, as compared to a calculated value of 466. This product was reacted with ethylene oxide for a 1:1 molar ratio and produced a brown, semi-solid product having a molecular weight of 510. This product is identified as compound number 13 in Table A which follows.

EXAMPLE 6

To 256 grams (1.0 mol) of palmitic acid 186 grams (1.0 mol) of tetraethylene pentamine were added according to the method described in Example 1 to provide an intermediate product which was thereafter treated with ethylene oxide in a 1:1 molar ratio to produce a white, water dispersible paste having limited acid solubility. This compound is identified as compound number 24 in Table A which follows.

EXAMPLE 7

According to procedure set forth in Example 1, 280 grams (1.0 mol) of oleic acid were reacted with 186 grams (1.0 mol) of tetraethylene pentamine and produced an oil-soluble, light brown oil having a molecular weight of 426. This is to be compared with a calculated molecular weight value for this intermediate reaction product of 436.

To 1.0 mol of the above product, 1.0 mol of ethylene oxide was added to provide a final reaction product which was a water-soluble, brown liquid, and is identified as compound number 28 in Table A.

In order to test the effectiveness of the foregoing compounds in inhibiting the swelling of hydratable clays that are present in chalk formations, and additionally and simultaneously providing protection against corrosion of the acidizing solutions in which they are normally used, the following test was used.

Cores from three horizons or potential oil producing zones of chalk formations were obtained, crushed, and mixed to make a composite chalk sample. This chalk sample averaged 94% $CaCO_3$ and 6% acid insoluble clays, the exact composition of which is not known. These insoluble clays, however, swell on contact with water, acidic or basic solutions.

In carrying out the evaluation of the new compounds described herein, 12 grams of the chalk sample are placed in a 100 cc. cylinder. 15 cc. of isopropyl alcohol are added to depress the foaming which results on the addition of 15% hydrochloric acid. Sufficient acid is added, either with or without additive, to fill the cylinder to the 100 cc. mark. The acid is added slowly to minimize foaming and is added in excess to insure substantially complete elimination of $CO_2$ from the chalk. Approximately 65 cc. of 15% hydrochloric acid are required to react with 12 grams of chalk.

In testing the additives, they are usually added in concentrations of 0.5%, based on the weight of dilute hydrochloric acid used. A control consisting of 15% hydrochloric acid is included in every series of tests. After all $CaCO_3$ has been consumed, the mixture is stirred well and allowed to settle for 24 hours. A reading is then taken of the clay volume remaining in the cylinder. The addition of additive to the acid which caused a clay volume less than the control test of hydrochloric acid without additive was considered to have clay anti-swelling properties.

The table which follows provides data on the clay volumes resulting from the use of a control hydrochloric acid and the hydrochloric acid containing commercially available additives (Commercial A and Commercial B) as well as acids containing additives prepared according to this invention.

The results recorded of the protection against corrosion provided by these new compounds are based on the test described in the co-pending application of William B. Hughes, Serial Number 547,342 filed November 16, 195.

It will be noted that the nature of the solution, clear, cloudy, or dispersion, is provided since, as previously discussed, clear solutions are more desirable. The effectiveness of the new compounds of this invention in simultaneously providing anti-swelling and corrosion inhibiting functions when used in conventional acidizing solutions will be readily apparent from the results recorded in the table which follows.

Table A

| Additive | | | Mol Ratio | Nature of Soln. | Clay Vol., cc. | Percent Reduction in Clay vol. | Percent Acid Inhibition at Additive Concns. of 100 p.p.m. |
|---|---|---|---|---|---|---|---|
| No. | Conc., Percent | Composition or Reaction | | | | | |
| Control | | (15% HCl only) | | Clear | 18.5 | | |
| Com. A | 0.5 | | | Dispersion | 12 | 35 | 65.8 |
| Com. B | 0.5 | | | do | 10 | 46 | 40.6 |
| Control | | (15% HCl only) | | Clear | 18.5 | | |
| 1 | 0.5 | DETA[1] Butyric | 1:1 | do | 12 | 35 | |
| 2 | 0.5 | DETA Butyric Etoxide | 1:1:1 | do | 14.5 | 22 | |
| 3 | 0.5 | DETA Palmitic | 1:1 | Dispersion | 11 | 41 | |
| 4 | 0.5 | DETA Palmitic Etoxide | 1:1:1 | do | 13 | 30 | |
| 5 | 0.5 | DETA Stearic | 1:1 | do | 25 | (35 incr.) | |
| 6 | 0.5 | DETA Stearic Etoxide | 1:1:1 | do | 22.5 | (22 incr.) | |
| 7 | 0.5 | DETA Oleic | 1:1 | do | 8.5 | 54 | 96.2 |
| 8 | 0.5 | DETA Oleic Etoxide | 1:1:1 | do | 7.8 | 59 | 96.3 |
| 9 | 0.5 | TETA[2] Acetic Etoxide | 1:1:1 | Clear | 15 | 19 | 71.4 |
| Control | | (15% HCl only) | | do | 18.5 | | |
| 10 | 0.5 | TETA Butyric | 1:1 | do | 12.5 | 32 | 88.6 |
| 11 | 0.5 | TETA Butyric Etoxide | 1:1:1 | do | 12.5 | 32 | 94.4 |
| 12 | 0.5 | TETA Palmitic | 1:1 | Dispersion | 10.5 | 43 | |
| 13 | 0.5 | TETA Palmitic Etoxide | 1:1:1 | Slight haze | 10 | 46 | |
| 14 | 0.5 | TETA Stearic | 1:1 | Dispersion | 26 | (41 incr.) | 91.3 |
| 15 | 0.5 | TETA Stearic Etoxide | 1:1:1 | do | 11 | 41 | 95.6 |
| 16 | 0.5 | TETA Oleic | 1:1 | do | 11 | 41 | 80.0 |
| 17 | 0.5 | TETA Oleic Etoxide | 1:1:2.8 | Clear | 9.8 | 47 | 97.2 |
| 18 | 0.1 | do | 1:1:2.8 | do | 15 | 21 | 97.2 |
| 19 | 0.3 | do | 1:1:2.8 | do | 10 | 47 | 97.2 |
| 20 | 1.0 | do | 1:1:2.8 | do | 9.7 | 49 | 97.2 |
| Control | | (15% HCl only) | | do | 18.5 | | |
| 21 | 0.5 | TEPA[3] Butyric | 1:1 | Clear | 14.5 | 22 | |
| 22 | 0.5 | TEPA Butyric Etoxide | 1:1:1 | do | 13.5 | 27 | |
| 23 | 0.5 | TEPA Palmitic | 1:1 | Dispersion | 10.5 | 43 | 96.9 |
| 24 | 0.5 | TEPA Palmitic Etoxide | 1:1:1 | Clear | 9.0 | 51 | 96.3 |
| 25 | 0.5 | TEPA Stearic | 1:1 | Dispersion | 13.5 | 27 | |
| 26 | 0.5 | TEPA Stearic Etoxide | 1:1:1 | do | 13.5 | 27 | |
| 27 | 0.5 | TEPA Oleic | 1:1 | Slight dispersion | 9.8 | 47 | 97.5 |
| 28 | 0.5 | TEPA Oleic Etoxide | 1:1:1 | Clear | 10.0 | 46 | 97.0 |

[1] Diethylene triamine.
[2] Triethylene tetramine.
[3] Tetraethylene pentamine.

A study of the results recorded in the preceding table will indicate the influence of several factors on the effectiveness of particular anti-swelling agents. As previously indicated, the molecular weight of the acid component used in preparing the final reaction product is of importance, as illustrated in Table B which follows. In the table, diethylene triamine, triethylene tetramine, and tetraethylene pentamine represent the respective polyethyleneamine compounds previously identified. Several of the final reaction products were tested with a view toward determining what effect the molecular weight of the acid would have on the effectiveness of the final reaction product. The results of these tests are shown in Table B which follows, in which the percent reduction in clay swelling is noted. Referring to Table B, it will be noted that as the molecular weight of the acid increases, the effectiveness of the final reaction product as an anti-swelling agent is increased. This increase appears to be independent of the particular polyethyleneamine used. The one exception in Table B, it will be noted, is the stearic acid reaction product in which no anti-swelling effect was noted with the imidazoline product obtained from diethylene triamine. However, an improved result was obtained when the intermediate reaction product of triethylene tetramine and stearic acid was treated with ethylene oxide as noted in Column B. The failure of the diethylene triamine stearic acid product in providing anti-swelling characteristics is not clearly understood, although presumably the solubility of the product had some bearing on its effectiveness.

The addition of ethylene oxide to the intermediate reaction product to provide the additives found to be so effective in simultaneously minimizing or inhibiting clay swelling and reducing corrosion in substantially all cases provided a generally superior result. It appears that additional polar groups provide increased solubility for the final reaction product, which is a decided advantage up to a certain limiting point. Experimentally, it has been found that, with the possible exception in the case of compound number 17, the 1:1:1 reaction product generally provides superior results.

Table B

| DETA[1] | Percent Redn. | | TETA[2] | Percent Redn. | | TEPA[3] | Percent Redn. | |
|---|---|---|---|---|---|---|---|---|
| | A | B | | A | B | | A | B |
| Acetic | 41 | | Acetic | | 19 | Acetic | | 24 |
| Butyric | 35 | 22 | Butyric | 32 | 32 | Butyric | 22 | 27 |
| Palmitic | 41 | 30 | Palmitic | 43 | 46 | Palmitic | 43 | 51 |
| Oleic | 54 | 59 | Oleic | 41 | 47 | Oleic | 47 | 46 |
| Stearic | 0 | 0 | Stearic | 0 | 41 | Stearic | 27 | 27 |

[1] Diethylene triamine.
[2] Triethylene tetramine.
[3] Tetraethylene pentamine.
A—without Etoxide added.
B—with Etoxide added.

It will be noted also that the use of unsaturated acids appears more desirable in that the unsaturation increases the effectiveness of the final product in minimizing clay swelling. (Compare additives number 5 and 6 with additives number 7 and 8, or additive number 15 with additive number 17; and additive number 26 with additive number 28.)

A further important characteristic of the final reaction products or additive compounds of this invention is their ability, when used in acidizing mixtures, to lower the interfacial tension between the acid and the oils present in the strata. Such a property is most important during the acidizing of formations since this property aids in the penetration of the acid into the formation being treated. One of the major problems encountered in conventional acidizing treatment is the difficulty in obtaining reverse or back-flow of spent acids from the formation into the injection or production well. It has been found that where the oil-water interfacial tension is high, the spent acid will be held in the formation by capillary forces, thus blocking flow of the oil into the well bore. If, on the other hand, the oil-water interfacial tension is low, as can sometimes be obtained by including selected additives, the spent acid will flow back more easily from the formation, thus allowing oil to flow to the well bore.

We have found that the compounds of our invention, in addition to providing both anti-swelling and anti-corrosive properties, also possess the ability to lower the interfacial tension between the acid and the oil. This is demonstrated in Table C which follows.

*Table C*

| Water Phase | Oil Phase | Interfacial Tension, dynes/ centimeter |
|---|---|---|
| Tap water | $C_{10}$-$C_{12}$ hydrocarbon | 39.5 |
| Do | Annona crude oil | 22.9 |
| 15% HCl | $C_{10}$-$C_{12}$ hydrocarbon | 36.3 |
| Do | Annona crude oil | 4.6 |
| 0.5 wt. percent No. 17 in 15% HCl | $C_{10}$-$C_{12}$ hydrocarbon | 7.6 |
| Do | Annona crude oil | 0.6 |
| 0.5 wt. percent No. 17 in water | $C_{10}$-$C_{12}$ hydrocarbon | 1.0 |
| Do | Annona crude oil | 0.1 |
| 0.5 wt. percent No. 8 in 15% HCl | $C_{10}$-$C_{12}$ hydrocarbon | 0.1 |
| Do | Annona crude oil | 0.1 |
| 0.5 wt. percent No. 8 in water | $C_{10}$-$C_{12}$ hydrocarbon | 0 |
| Do | Annona crude oil | 0.1 |

In Table C, additives number 17 and 8 refer to the additives identified by the same designation in the Table A. As shown in Table C, above, additives of our invention effectively lower the interfacial tension between the oil and treating acid. This contributes considerably to the penetrating power of the acid in the formation being treated. To illustrate this effect, a series of acidizing treatments was conducted with these additives on chalk cores of very low permeability. The cores tested were ¾ inches in diameter and ¾ inches long, and had varying permeabilities of from about 0.005 to 0.01 millidarcies to water. The results of the acidization of these cores are recorded in Table D below.

*Table D*

| Core No. | Acidizing Pressure, p.s.i. | 4.9 N acid | Additive | Percent Increase in Water Permeability due to Acidizing | Length of Acid Treatment (Min.) |
|---|---|---|---|---|---|
| 40-2 | 400 | HCl | None | (80 decrease) | 60. |
| 42-2B | 400 | HCl | None | (78 decrease) | 60. |
| S43B-2 | 400 | HCl | X-01[1] | 2,900 | 60. |
| 104-5a | 800 | 50% HCl, 50% Acetic | None | (64 decrease) | 60. |
| 106-8 | 800 | do | X-01 | 26 | 60. |
| Continue Acidizing 104-5a and 106-8 at higher pressure: | | | | | |
| 104-5a | 1,000 | 50% HCl, 50% Acetic | None | $1.7 \times 10^5$ | 61.9. B.T.[2] |
| 106-8 | 1,000 | do | X-01 | $2.7 \times 10^4$ | 1.3 B.T. |

[1] X-01 = product of condensing triethylene tetramine, oleic acid and ethylene oxide in a 1 : 1 : 2.8 ratio.
[2] Breakthrough of acid.

In Table D above, the time required for acid breakthrough is a measure of the acid mixture efficiency in penetrating a formation. When a breakthrough is obtained in the course of an acid treatment of a formation, there is generally obtained a substantially infinite increase in permeability. This, of course, is most desirable when treating strata of very low permeability.

In using the improved agents of this invention, either for their anti-swelling effect, corrosion inhibiting effect, or their ability to lower interfacial tension between acid and oil, it is, of course, understood that these effects may be obtained singularly or in combination, and when used for such purposes, they may be introduced generally along with the treating solutions, in most cases the acidizing solution being used in treating the formation. It is, of course, further understood that during such use, the additives of this invention may be combined with other well known treating agents such as emulsion breakers, scale inhibitors, or other additives having properties suitable for a particular purpose.

It is further evident that the improved compounds of this invention are not restricted to use in the acidizing of formations, but may be employed to obtain the benefit of any of their unique characteristics, depending on the requirements of the situation in which they are used:

Having now described our invention, what we claim as new and useful is:

1. A process for increasing the permeability of oil-bearing chalk formations containing as much as 10% hydratable clays by inhibiting clay swelling during acidizing which comprises introducing into the chalk formation a clear well-treating solution comprising an acidizing amount of hydrochloric acid, an amount of acetic acid substantially equal to the amount of hydrochloric acid and a small amount of the final reaction product obtained by condensing one mol of a polyethyleneamine selected from the group consisting of diethylene triamine, triethylene tetramine and tetraethylene pentamine with an equimolar amount of oleic acid, removing sufficient water from the reaction zone to form an intermediate imidazoline reaction product, reacting the intermediate imidazoline product obtained with an equimolar quantity of ethylene oxide by passing ethylene oxide through an alcohol solution of the intermediate imidazoline product and recovering a final reaction product.

2. The process of claim 1 wherein the polyethylene used in the preparation of the imidazoline product is diethylene triamine.

3. The process of claim 1 wherein the polyethylene used in the preparation of the imidazoline product is triethylene tetramine.

4. The process of claim 1 wherein the polyethylene used in the preparation of the imidazoline product is tetraethylene pentamine.

References Cited in the file of this patent

UNITED STATES PATENTS

| | | |
|---|---|---|
| 2,211,001 | Chwala | Aug. 13, 1940 |
| 2,292,208 | De Groote et al. | Aug. 4, 1942 |
| 2,468,163 | Blair et al. | Apr. 26, 1949 |
| 2,520,102 | Tyron | Aug. 22, 1950 |
| 2,564,758 | Haggard | Aug. 21, 1951 |
| 2,646,399 | Hughes | July 21, 1953 |
| 2,713,033 | Cardwell et al. | July 12, 1955 |
| 2,713,582 | Smith | July 19, 1955 |
| 2,721,175 | Lytle | Oct. 18, 1955 |
| 2,738,325 | Rydell | Mar. 13, 1956 |